Nov. 10, 1970   M. R. SOMMERIA   3,539,897
SERVO CONTROL SYSTEM INCLUDING MEANS TO COMPARE PROGRAMMED
VELOCITY WITH ACTUAL VELOCITY TO ELIMINATE VELOCITY ERROR
Filed July 22, 1968
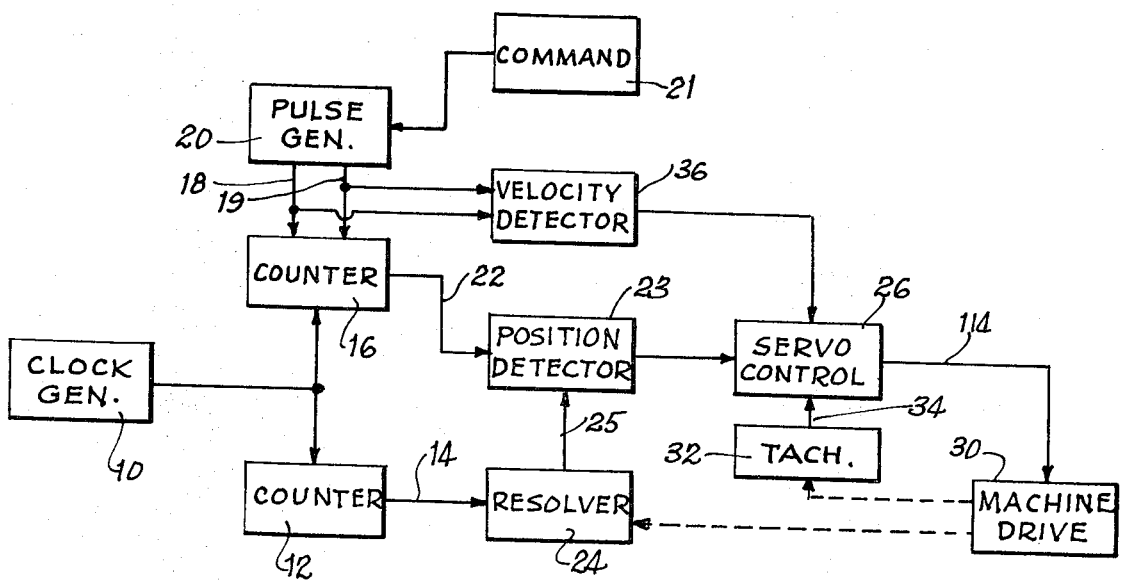
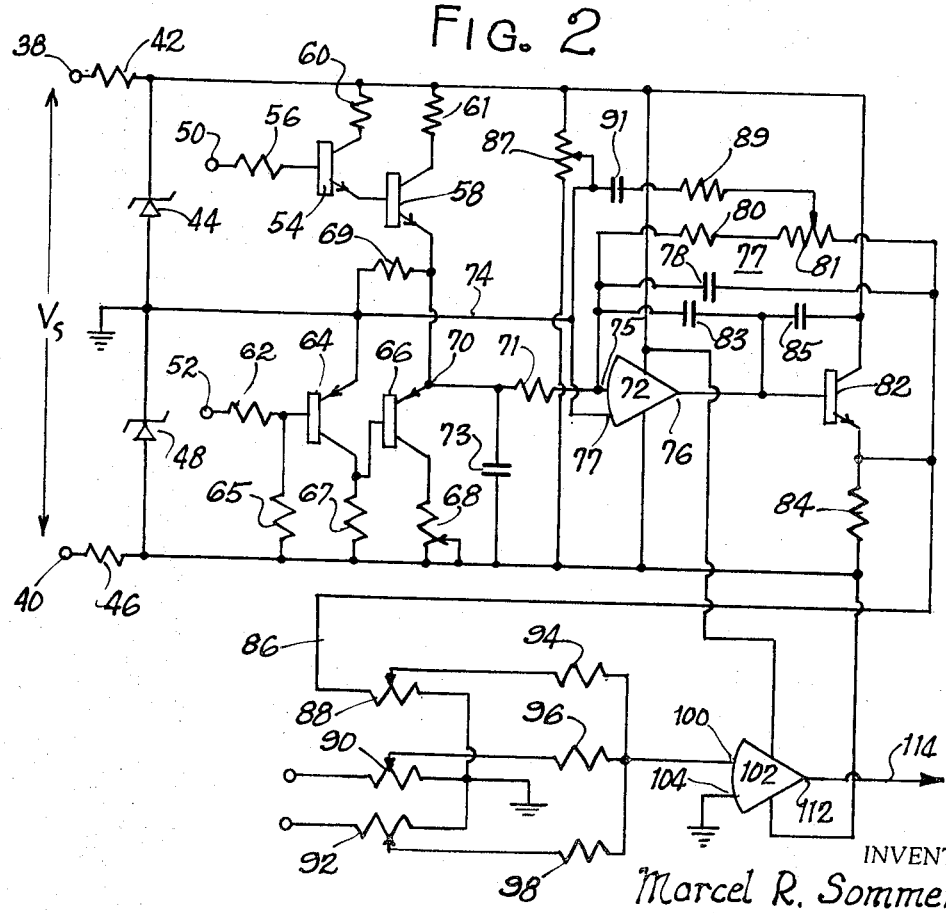
INVENTOR.
Marcel R. Sommeria
BY Pendleton Neuman
Seibold & Williams
Attys

United States Patent Office 3,539,897
Patented Nov. 10, 1970

3,539,897
SERVO CONTROL SYSTEM INCLUDING MEANS TO COMPARE PROGRAMMED VELOCITY WITH ACTUAL VELOCITY TO ELIMINATE VELOCITY ERROR
Marcel R. Sommeria, Palos Heights, Ill., assignor to Hyper-Loop, Inc., Summit, Ill., a corporation of Illinois
Filed July 22, 1968, Ser. No. 746,445
Int. Cl. G05b *19/38*
U.S. Cl. 318—618                    10 Claims

ABSTRACT OF THE DISCLOSURE

This disclosure relates to a servo control system as used in combination with numerical control apparatus for machine tools. The servo control system responds to an input signal comprising a train of pulses, the separation of which is modulated to designate programmed movement of the machine. The servo control system controls a servo drive apparatus in response to the frequency of the input pulse train, in addition to controlling the servo drive apparatus in accordance with the instantaneous position and velocity of the driven apparatus, so that the lag between actual and programmed positions of the driven apparatus may be reduced with no attendant system instability.

---

The present invention relates to servo control units, and particularly to such units employed with numerical control machine tool drive systems.

In a common type of numerical control system, a numerical or digital input is converted into a number of program pulses corresponding to a number of increments of movement of some portion of the machine along each of a number of different axes or dimensions. These increments are commonly .0001 inch each. A control mechanism is responsive to the program pulses and to a signal generated in response to machine movement, to actuate a servo drive to control the machine movement in accordance with the digital input.

The control mechanism includes a counter, actuated by a train of clock pulses from a clock pulse generator, while a train of the program pulses, generated in response to a command of the operator or an automatic program, adds to, or subtracts from, the effect of the clock pulses in successively changing the state of the counter to represent successively increasing quantities. Addition or subtraction is controlled by the sign of the digital input. An output pulse is derived from the counter each time the counter reaches the state representative of its maximum capacity. The output pulses, which may be referred to as overflow pulses, are phase modulated in accordance with the frequency of the program pulses, for the period of each cycle is dependent upon the number of program pulses generated between successive overflow pulses. The phase of the train of overflow pulses, hereinafter referred to as the control pulse train, is compared with that of a second train of overflow pulses, generated in a similar manner by a second counter, which is actuated solely by the clock pulses. The phase of the second pulse train, which will be referred to as the standard pulse train, is modified by a resolver, in response to movement of the machine, so that the phase difference between the pulses in the control pulse train and the standard pulse train is proportional to the distance which the machine is to move, in accordance with the instantaneous command. The phase difference is detected in a phase demodulator, the output of which is a series of pulses, the length of which is modulated in accordance with the phase difference between the two series of overflow pulses.

In a servo control unit, the pulse-length modulated pulses are averaged to produce a D.C. error signal which is proportional to the deviation between the actual position of the machine, and the programmed position, as determined by the digital input. The error signal is applied to the servo drive, which controls the driving apparatus of the machine so as to track the programmed position. The actual machine position actually lags behind the programmed position, however, and the quality of the system may be expressed in terms of velocity per unit distance of lag.

The system is stabilized by means of what may be called "viscous damping." Such damping is accomplished by means of a tachometer. The tachometer furnishes a D.C. signal proportional to the velocity of the driven apparatus relative to the machine frame. The D.C. damping signal is then mixed with the position error signal, and increases the stability of the system. The use of a tachometer, however, does not permit reduction of the lag between the actual machine position and the programmed position, but rather tends to increase the lag by trading off accuracy in favor of stability.

With prior art servo control units, such as the one described above, any attempt to reduce the amount of lag between the actual machine position and the programmed position results in instability, or "overshoot." The present invention has the function of reducing the lag without any decrease in stability, and therefore improves the quality of the machine with which it is employed.

Accordingly, it is a principal object of the present invention to provide means whereby the lag between the programmed position and the actual position of servo-driven apparatus is reduced, without any decrease in stability.

Another object of the present invention is to provide means for accomplishing the foregoing in an economical and efficient manner.

A further object of the present invention is to provide such apparatus which is easily constructed and is not subject to the need for frequent adjustment and/or calibration.

These and other objects of the present invention will be more fully understood by an examination of the following description and the accompanying claims and drawings.

In one embodiment of the present invention, there is provided means for generating signals corresponding to a programmed position of a driven member relative to a reference and signals corresponding to the actual position of the driven member, means for deriving a signal in response to the rate of change of the programmed position, and means for combining said difference signal and said rate signal to provide a composite signal for controlling the operation of a servo system to move the driven member.

Reference will now be made to the accompanying drawings in which:

FIG. 1 is a functional block diagram of a numerical control system incorporating an illustrative embodiment of the present invention; and FIG. 2 is a schematic diagram of a portion of the apparatus illustrated in FIG. 1.

Referring to FIG. 1, a clock generator 10 is provided to continuously produce a train of pulses having a relatively constant frequency. Operations are performed in the digital section of the numeral control equipment are performed in timed sequence, controlled by the clock pulses of the clock generator 10. A standard counter 12 is connected to the output of the clock generator 10 and the clock pulses advance the state of the counter 12 until its full capacity is reached. After being counted to its capacity, the next incoming pulse resets the counter 12 to its zero state, and successive pulses continue to advance the state of the counter 12. An overflow pulse on the line 14 is produced each time the counter is reset, after being counted to its capacity.

A second counter 16 is connected to the clock generator 10 and is also adapted to count clock pulses. The counter 16 also receives inputs on lines 18 and 19 from a pulse generator 20, controlled by a digital command apparatus 21, which may be either manual or automatic. The lines 18 and 19 convey a series of pulses which corresponds to the desired movement of the machine drive in one direction or the other in a single dimension. If the driven element of the machine is to move in one direction, the pulses appear on line 18 and are added, in the counter 16, to the total number of clock pulses from the generator 10. The position signal pulses appear on line 19, and are subtracted from the counter 16, when the driven element of the machine is to be moved in the opposite direction.

Overflow pulses are produced by the counter 16 in the same manner as has been described relative to the counter 12, and appear on an output line 22. There is a phase difference between the overflow pulses produced on the line 22 and those produced on the line 14, as a result of the position signals from the pulse generator 20. This difference is detected in a detector 23, having one input connected directly from the line 22, and a second input connected from the line 14 through a resolver 24. The resolver 24 is mechanically coupled to the driven element of the machine, and functions to shift the phase of its output signal on line 25, relative to the phase of the pulse received on line 14, in response to movement of the machine drive 30. The detector 23 produces a D.C. signal proportional to the difference between the actual machine position, as indicated by the signal on the line 25, and its programmed position, as indicated by the signal on the line 22. The sign of the D.C. output represents the direction in which the drive machine element must be moved to assume its programmed position.

The output of the detector 23 is applied to a servo control circuit 26, the output of which controls the machine drive unit 30. The machine drive 30 may be either electric or hydraulic and includes a motor and suitable apparatus for controlling the speed and torque of the motor in accordance withm the output of the servo control circuit 26. As such apparatus is well known in the art, it will not be described in detail herein. Mechanical connections among the components of FIG. 1 are illustrated by dashed lines. Thus, the machine drive unit 30, the resolver 24 and a tachometer 30 are all coupled together. The tachometer 32 produces an electrical signal in response to the velocity of the driven machine element relative to the frame of the machine, and this signal is applied to the servo control circuit 26 via line 34. The signal from the tachometer 32 is employed to damp the response of the system to the position information from the detector 23.

As has been pointed out above, a tachometer has been employed in the prior art to stabilize the system and prevent the driven machine element from hunting or oscillating about the programmed position. A large tachometer signal increases the following error, however, and renders the apparatus less sensitive and less accurate without it. Therefore, a compromise is usually effected between the two desirable conditions of stability and accuracy. The present invention overcomes the need for this compromise by means of a velocity detector 36, connected to the lines 18 and 19, which senses the rate of change of the position command information produced by the pulse generator 20 and furnishes a third input to the servo control circuit 26 in response thereto. The velocity detector 36 and the servo control circuit 26 will now be described in detail with reference to FIG. 2.

Referring now to FIG. 2, a source of voltage $V_s$ is interconnected between terminals 38 and 40 which are, respectively, positive and negative, relative to ground. A resistor 42 and a Zener diode 44 are connetced from the terminal 38 to ground, to maintain a regulated positive voltage at the anode of the Zener diode 44. In similar fashion, a resistor 46 and a Zener diode 48 are connected from the terminal 40 to ground to maintain a regulated voltage at the cathode of a Zener diode 48. The Zener diodes 44 and 48 are matched to provide equal positive and negative regulated voltages.

Two terminals are provided to receive position signals from the pulse generator 20. Terminal 50 receives the pulses from the pulse generator 20 along line 18 in FIG. 1, when the machine drive is programmed to move in a forward direction, and terminal 52 receives pulses along line 19 in FIG. 1 when the machine drive is to move in the opposite direction. The terminal 50 is connected to the base of a transistor 54 through a resistor 56. The transistor 54 is connected in a Darlington circuit with another transistor 58. A resistor 60 is connected from the collector of the transistor 54 to the anode of the Zener diode 44, and a resistor 61 is connected from the collector of the transistor 58 to the anode of the Zener diode 44.

The terminal 52 is connected through a resistor 62 to the base of a transistor 64. The transistor 64 is connected in a cascade circuit with another transistor 66 and has a base resistor 65 and a collector resistor 67, both connected to the cathode of the Zener diode 48. The emitter of the transistor 66 is connected to the emitter of the transistor 58, and the collector of the transistor 66 is connected to the cathode of the Zener diode 48 via a rheostat 68. The emitters of the transistors 58 and 66 are connected together at a junction point 70. A capacitor 73 is connected between the junction point 70 and the cathode of the diode 48, and a resistor 69 connects the junction point 70 to ground.

The transistors 54 and 58 are both NPN units, whereas the transistors 64 and 66 are both PNP units. The value of R65 is chosen to prevent transistor 66 from conducting when no signal is impressed at the terminal 52. Also, the transistor 58 does not conduct when no signal is applied to the terminal 50. When a pulse is received at one or the other of the terminals 50 and 52, one of the transistors 58 or 66 saturates for the duration of the pulse.

The junction 70 is connected to one input 75 of an operational amplifier 72 via a resistor 71. The sign of the current at the input of the amplifier 72 depends on which of the transistors 58 or 66 has saturated.

The other input 77 of the operational amplifier 72 is connected to ground via a line 74. The operational amplifier 72 produces at an output 76 a signal which corresponds to that applied to the input 75, but the output is greatly amplified and inverted. The amplification is equal to the ratio of the combined resistance of a resistor 80 and a rheostat 81 to the resistance of the resistor 71. The resistor 80 and the rheostat 81 are connected between the input terminal 75 and the output of an emitter follower transistor 82, connected to the output of the amplifier 72.

A feedback capacitor 78 is connected in parallel with the resistor 80 and the rheostat 81. The feedback capacitor 78 makes the operational amplifier 74 an integrator, with a time constant dependent upon the product of the resistance of the resistor 80 and rheostat 81, and capacitance of the capacitor 78. The resistor 80 and the rheostat 81 allow the integrated charge accumulated on the capacitor 78 to gradually dissipate, so that the output of the operational amplifier 72, at the output terminal 76, is the time average of the pulses applied to the input terminals 50 and 52, the period of the average being dependent on the time constant of the network 77. The capacitor 73 operates in much the same way as the capacitor 78, and combines its smoothing action with that of the capacitor 78. A capacitor 83 is connected between the output and input of the operational amplifier 77 to prevent it from oscillating at high frequency.

A potentiometer 87 has its end terminals connected between the anode of the diode 44 and the cathode of the diode 48. Its tap is connected to the input 75 of the operational amplifier 77. The potentiometer 87 regulates the bias of the operational amplifier 72, and is adjusted for an output null with no input. Adjustment of the potentiometer 81 regulates the gain of the operational amplifier 72, and the potentiometer 68 is adjusted so that pulses on the two inputs 50 and 52 have equal effect.

A circuit including a resistor 89 and a capacitor 91 is connected from the junction of the resistor 80 and the rheostat 81 to ground. This circuit produces a forcing action during acceleration and deceleration, by modifying the shape of velocity signal. The effect of the forcing circuit is to decrease the amount of feedback of high frequency signals, so that the output may respond rapidly to abrupt changes in programmed velocity.

The amplitude of the time average signal depends on the frequency of the input pulses, and its sign depends on which of the input terminals 50 and 52 the program pulses are presented to. As there is one program pulse for each programmed incremental movement of the machine, the frequency of the program pulses is proportional to the programmed velocity, or the time rate of change of the programmed position. Accordingly, the output available at terminal 76 is a function of the programmed velocity.

This output is connected to the base of a transistor 82. The transistor 82 has its collector connected to the anode of the Zener diode 44 and its emitter connected via a resistor 84 to the cathode of the Zener diode 48. The transistor 82 amplifies the power of the programmed velocity signal from the operational amplifier 72, and presents the amplified signal on a line 86, connected between the emitter of the transistor 82 and one end of a potentiometer 88, the other end of which is connected to ground. A capacitor 85, connected between the base and collector of the transistor 82 prevents oscillation at high frequency.

Two other potentiometers 90 and 92 are provided, respectively connected to the output of the position detector circuit 23 (FIG. 1) and the output of the tachometer 32. The taps of the potentiometers 88, 90 and 92 are connected through resistors 94, 96 and 98, respectively, to one input 100 of an operational amplifier 102. The other input 104 of the operational amplifier 102 is connected to ground. The operational amplifier 102 is the main component of the servo control circuit 26 (FIG. 1). The output terminal of the servo control circuit 26 is connected to the machine drive 30 via a line 114.

The input signal presented to the input terminal 100 of the operational amplifier 102 is the composite of the three signals from the potentiometers 88, 90 and 92. The circuit including the three potentiometers 88, 90 and 92 is a summing circuit, so that the composite signal at the input 100 of the operational amplifier 102 is a constant fraction of the sum of the three signals at the taps of the three potentiometers. Each of these potentiometers is adjustable to permit variation of the composition of the composite signal, so that the optimum of degree of accuracy and stability may be arrived at.

The effect of the programmed velocity signal, applied to the potentiometer 88 via the line 86, is to partially buck out the effect of the signal from the tachometer 32. That is, if the programmed velocity is the same as the actual velocity of the machine at a given time, for example, the signals presented at the taps of the potentiometers 88 and 92, for a certain setting of the potentiometers 88 and 92, will be opposite in sign, so that they partially cancel each other and make the output on line 114 responsive to a much reduced signal from the position detector 23, which makes up for only the small difference between the signals of potentiometers 88 and 92. The output signal on the line 114 is also rendered capable of more rapid change in its amplitude, for the time constants of the velocity detector 36 and the servo control 26 are made very short. In contrast to this, the signal from the tachometer 32 is limited in its response by the mass of the movable machine parts.

When the programmed velocity decreases to zero, corresponding to periods in which the machine is to remain stationary, the output on the line 86 ceases, thereby permitting the full signal from the tachometer to detract from the effect of the position signal to provide the requisite damping to prevent overshoot of the programmed position.

When the potentiometers 88 and 92 are set as described above, the signal from the tachometer is partially removed when the machine velocity and the programmed velocity are equal. Although this may be the optimum setting of the potentiometers 88 and 92 for some systems, the present invention also contemplates adjusting the potentiometer 88 up or down, relative to the setting of the potentiometer 92, to achieve the optimum performance, while maintaining stability, for any particular combination of machine and program. Whatever the setting of the potentiometer 88, the full tachometer voltage is still available for damping, for the signal on the line 86 still vanishes when the programmed velocity goes to zero. This optimum setting may readily be determined by increasing the setting of the potentiometer 90 until instability occurs, and then increasing the setting of the potentiometer 92 until stability is regained.

Since the programmed velocity signal accomplishes the function of bucking out the tachometer signal during periods of rapid machine movement the amplitude of the tachometer signal, relative to the amplitude of the signal from the position detector 23, may be made greater than was possible in the prior art apparatus, where an increase in the tachometer signal brought about an increase in the following error. In the present arrangement, however, an increase in the amplitude of both the tachometer signal and the programmed velocity signal achieves, at the same time, a decrease in the following error, and an improvement in the damping. Accordingly, a machine may be driven at a higher maximum velocity with the present invention without any instability.

In the foregoing, the present invention has been described with sufficient particularity as to enable others skilled in the art to make and use the same and, by applying current knowledge, to adapt the same for use under a variety of conditions without departing from the essential features of novelty thereof, which are intended to be defined and secured by the appended claims.

What is claimed is:

1. Servo control apparatus responsive to a signal representative of an error between a programmed position and the actual position of a movable servo controlled member and to a signal representative of the rate of change with respect to time of said programmed position for deriving a servo controlling output signal, comprising in combination, generating means for producing a discrete signal for each incremental movement of said programmed position detector means connected to said generating means and responsive to the position of said movable member for deriving a position signal representative of the difference between the programmed position and the actual position if said member, velocity detector means connected to said generating means for deriving a programmed velocity signal representative of the frequency of said discrete signals, means for mixing said position signal and said programmed velocity signal to produce an output signal, and drive means responsive to said output signal for moving said movable member.

2. Apparatus according to claim 1, wherein said mixing means comprises a summing circuit having inputs connected to receive said position signal from said position detector means and said velocity signal from said velocity detector means, said output signal being a constant fraction of the sum of said position and velocity signals.

3. Apparatus according to claim 1, wherein said velocity detector means comprises amplifier means for amplifying the pulses from said generator and a feedback circuit connected between the input and the output of said amplifier means for producing a velocity signal which is the time average of the pulses generated by said generating means during the immediately preceding period, said period being determined by the time constant of said feedback circuit.

4. Apparatus according to claim 1, including tachometer means responsive to the movement of said movable member for generating a signal representative of the actual velocity of said member, and means connecting said tachometer means to said mixing means, said mixing means being operable to mix the signal from said tachometer with said programmed velocity signal and said position signal in deriving said output signal.

5. Apparatus according to claim 4, including means for cancelling the effect on said output signal of said programmed velocity signal and said actual velocity signal when the programmed velocity is equal to the actual velocity.

6. In combination with numerically controlled power tool apparatus including program means for producing a series of pulses corresponding to the number of unit distances a movable member of the power tool is to move, drive apparatus for moving said movable member, and servo means responsive to said program means and to the position of said movable member to generate an error signal for controlling said drive apparatus; a servo control unit comprising velocity detector means connected to said program means for deriving a signal representative of the programmed velocity of said movable member, position detector means connected to said program means and responsive to the position of said movable member for deriving a signal representative of the difference between the programmed position and the actual position of said movable member, means for deriving a signal representative of the actual velocity of said movable member, and means for combining said difference signal, said programmed velocity signal and said actual velocity signal to generate a control signal, said control signal being connected to said drive means and operable to control said drive means to move said movable member to minimize the difference between said programmed position and said actual position, said programmed velocity signal and said actual velocity signal cancelling the effect of each other on said control signal when the programmed velocity is the same as said actual velocity.

7. A method of controlling a servo mechanism to cause a drive means to move a movable member in accordance with programmed movement, comprising the steps of deriving an electrical signal representative of the difference between the programmed position of said member and the actual position of said member, deriving an electrical signal representative of the programmed velocity of said movable member, deriving an electrical signal representative of the actual velocity of said movable member, and combining said three signals to derive an output signal for controlling said drive means.

8. The method according to claim 7, including the step of summing said three signals so that the effect on said output signal of said programmed velocity signal and said actual velocity signal are equal and opposite when the actual velocity is equal to the programmed velocity.

9. The method according to claim 7, wherein said programmed velocity signal is derived by producing a signal in response to the frequency of pulses defining said programmed movement in which each pulse represents an incremental programmed movement.

10. The method according to claim 9, including the step of deriving said programmed velocity signal by deriving the time average of said pulses over a short period of time.

References Cited

UNITED STATES PATENTS

| 2,470,099 | 5/1949 | Hall | 318—20.435 X |
| 2,939,066 | 5/1960 | Crenshaw | 318—20.427 X |
| 3,005,139 | 10/1961 | Chin et al. | 318—20.435 |
| 3,081,425 | 3/1963 | Newbold | 318—20.395 X |

THOMAS E. LYNCH, Primary Examiner

U.S. Cl. X.R.

318—608, 616, 632

UNITED STATES PATENT OFFICE
CERTIFICATE OF CORRECTION

Patent No. 3,539,897    Dated November 10, 1970

Inventor(s) MARCEL R. SOMMERIA

It is certified that error appears in the above-identified patent and that said Letters Patent are hereby corrected as shown below:

Column 2, line 52, after "response" insert -- to the difference between the programmed and actual positions, means for deriving a signal in response -- line 66, after "Operations" delete -- are --

Line 67, delete "numeral" and insert therefore -- numerical --

Column 3, lines 12 and 13, delete "corresponds" and insert there -- correspond -- line 28, before "is" insert -- in phase -- line 40, delete "drive" and insert therefor -- driven line 47, delete "withm" and insert therefor -- with -- line 52, after "tachometer" delete "30" and insert therefor -- 32 -- line 66, before "without" insert -- than --

Column 4, line 11, after "regulated" insert -- negative --

Column 6, line 65, after "position" insert a comma (,)

line 66, before "detector" insert -- position -- line 70, delete "if" and insert therefor -- of --

SIGNED AND SEALED

MAR 2 1971

(SEAL)
Attest:

Edward M. Fletcher, Jr.
Attesting Officer

WILLIAM E. SCHUYLER,
Commissioner of Patents

FORM PO-1050 (10-69)